(12) United States Patent
Ueda et al.

(10) Patent No.: US 12,040,670 B2
(45) Date of Patent: Jul. 16, 2024

(54) ARMATURE WINDING OF ROTATING ELECTRICAL MACHINE, AND ROTATING ELECTRICAL MACHINE

(71) Applicants: KABUSHIKI KAISHA TOSHIBA, Tokyo (JP); Toshiba Energy Systems & Solutions Corporation, Kawasaki (JP)

(72) Inventors: Takashi Ueda, Yokohama Kanagawa (JP); Masafumi Fujita, Yokohama Kanagawa (JP); Masashi Okubo, Kawasaki Kanagawa (JP); Hiroaki Ishizuka, Tokyo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 365 days.

(21) Appl. No.: 17/581,599

(22) Filed: Jan. 21, 2022

(65) Prior Publication Data
US 2022/0149686 A1     May 12, 2022

Related U.S. Application Data

(63) Continuation of application No. PCT/JP2020/045855, filed on Dec. 9, 2020.

(30) Foreign Application Priority Data

Dec. 9, 2019    (JP) ................... 2019-222219

(51) Int. Cl.
*H02K 3/18*     (2006.01)
*H02K 3/28*     (2006.01)

(52) U.S. Cl.
CPC ............... *H02K 3/18* (2013.01); *H02K 3/28* (2013.01)

(58) Field of Classification Search
CPC ................................ H02K 3/18; H02K 3/28
See application file for complete search history.

(56) References Cited

U.S. PATENT DOCUMENTS

2001/0038252 A1    11/2001   Yamamoto
2009/0096312 A1*   4/2009   Tokumasu ............ H02K 3/28
                                                            310/198

(Continued)

FOREIGN PATENT DOCUMENTS

JP     S56-044360 A     4/1981
JP     3469164 B2     11/2003

(Continued)

OTHER PUBLICATIONS

M. Wallin et al. "Reduction of Unbalanced Magnetic Pull in Synchronous Machines due to Parallel Circuits", IEEE Transactions on Magnetics, vol. 47, No. 12, Dec. 2011, pp. 4827-4833.

*Primary Examiner* — Gary A Nash
(74) *Attorney, Agent, or Firm* — Foley & Lardner LLP

(57) ABSTRACT

According to one embodiment, there is provided an armature winding of a rotating electrical machine, the armature winding being a 3-phase 6 or more even-number pole two-layer wound armature winding. The armature winding includes three or more parallel circuits provided in each phase, an individual coil constituting each of the circuits being connected by wave winding, each circuit being arranged so that phase belts respectively overlap phase belts of "number of poles/2" in the circuits on both adjacent sides, and the phase belts being arranged at different positions in a circumferential direction in each circuit.

5 Claims, 11 Drawing Sheets

(56) References Cited

U.S. PATENT DOCUMENTS

| | | | | |
|---|---|---|---|---|
| 2010/0277029 | A1* | 11/2010 | Fujita | H02K 3/28 |
| | | | | 310/208 |
| 2012/0248925 | A1 | 10/2012 | Fukasaku | |
| 2013/0221792 | A1* | 8/2013 | Tokumasu | H02K 3/12 |
| | | | | 310/203 |
| 2014/0333170 | A1* | 11/2014 | Sutrisna | H02K 3/12 |
| | | | | 310/208 |
| 2014/0346914 | A1* | 11/2014 | Funasaki | H02K 3/28 |
| | | | | 310/198 |
| 2015/0076953 | A1 | 3/2015 | Tamura | |
| 2017/0310182 | A1* | 10/2017 | Ueda | H02K 3/28 |

FOREIGN PATENT DOCUMENTS

| | | |
|---|---|---|
| JP | 5488517 B2 | 5/2014 |
| JP | 2015-084635 A | 4/2015 |

* cited by examiner

ARMATURE WINDING OF ROTATING ELECTRICAL MACHINE, AND ROTATING ELECTRICAL MACHINE

CROSS-REFERENCE TO RELATED APPLICATIONS

This application is a Continuation Application of PCT Application No. PCT/JP2020/045855, filed Dec. 9, 2020 and based upon and claiming the benefit of priority from Japanese Patent Application No. 2019-222219, filed Dec. 9, 2019, the entire contents of all of which are incorporated herein by reference.

FIELD

Embodiments described herein relate generally to an armature winding of a rotating electrical machine, and a rotating electrical machine.

BACKGROUND

In general, a three-phase alternating current rotating electrical machine (hereinafter referred to as a "rotating electrical machine") includes an armature portion 1, a field portion 2, a shaft 3, etc. as shown in FIG. 7. One of the armature portion 1 and the field portion 2 rotates as a rotor, and the other is fixed as a stator. Here, a case where the armature portion 1 is a stator and the field portion 2 is a rotor will be described as an example.

The armature portion 1 shown in FIG. 7 includes an armature core 5 and an armature winding 6, the armature core 5 being formed by stacking laminated iron plates, and the armature winding 6 being accommodated in a slot 7 provided in a peripheral portion of the armature core 5. The armature winding 6 is arranged as two layers of upper coil pieces 8 on a side closer to a slot opening portion and lower coil pieces 9 on a slot bottom side, and an outer peripheral portion thereof is covered with a main insulating layer.

The winding method of the armature winding 6 of the rotating electrical machine includes lap winding and wave winding. A structure in which a hexagonal coil is formed by two coil pieces is referred to as lap winding, and a structure in which the coil pieces sequentially pass through each magnetic pole and wind in one direction is referred to as wave winding. The wave winding is adopted in a large-capacity rotating electrical machine such as a water turbine generator, because the wave winding can omit an inter-pole connecting wire, can be easily manufactured, and can reduce AC loss generated in the inter-pole connecting wire, as compared to lap winding, and the wave winding is therefore effective in improving performance of the rotating electrical machine. Hereinafter, the wave winding will be described.

FIG. 8 is a schematic development view of an armature winding of a general wave winding in a 3-phase 12-pole 72-slot rotating electrical machine having four parallel circuits. As shown in FIG. 8, the armature winding includes a U-phase winding, a V-phase winding, and a W-phase winding, and each of the parallel circuits of each phase is wound so as to sequentially pass through each magnetic pole and wind around the armature.

FIG. 9 is a diagram showing only one phase of the schematic development view of the armature winding shown in FIG. 8, and separately shows the four parallel circuits in the one phase. For the other two phases not shown in FIG. 9, the configuration of the armature winding of the illustrated phase is shifted by 120 degrees and 240 degrees in electrical angle, respectively.

Although slot numbers are shown in FIGS. 8 and 9, only odd-numbered slots are shown and even-numbered slots are omitted to avoid complexity.

As shown in FIG. 9, the armature winding of each parallel circuit includes upper coil pieces 8 disposed on an opening side in the slot and lower coil pieces 9 disposed on a bottom side of the slot, and the upper coil pieces 8 and the lower coil pieces 9 are sequentially connected in series in one direction in the circumferential direction of the rotating electrical machine at a connection side coil end 10 in which the ends of the upper coil pieces 8 and the lower coil pieces 9 are wound and connected to each other and a counter-connection side coil end 11 not connected to lead portions 15 and 16 on the opposite side in the axial direction, to form phase belts 14 by twelve phase belts 13.

Here, the phase belt 13 refers to a winding portion in which the upper coil pieces 8 and the lower coil pieces 9 are respectively accommodated in two layers in a plurality of slots 7 provided in the armature core 5 and are allocated by dividing each of three phases into a plurality of phases, and these are connected to form the same phase.

In addition, in a rotating electrical machine having multiple parallel circuits, when voltages induced between the parallel circuits are unbalanced, a circulating current is generated between the parallel circuits and an armature winding temperature is increased, thereby causing a heating or burning accident in the worst case. Therefore, the arrangements of the upper and lower coils arranged in the slots 7 are exchanged via jumper wires 12 so that the voltages induced in the respective parallel circuits are balanced. In FIG. 9, the coil arrangements are exchanged by one slot at every six phase belts so that the voltages induced by the parallel circuits are balanced.

FIG. 10 shows a coil arrangement image of the parallel circuits corresponding to one phase of the armature winding 1 shown in FIG. 9, and FIG. 11 shows an axial cross section of the rotating electrical machine having the parallel circuits.

Here, a conventional armature winding method will be described by taking a second circuit of the four parallel circuits (first to fourth circuits) shown in FIGS. 9 to 11 as an example.

As shown in FIG. 9, the winding of the second circuit is led from the winding lead portion 15 through the lower coil piece in a 67th slot, the upper coil piece in a 2nd slot, the lower coil piece in a 7th slot, the upper coil piece in a 14th slot, the lower coil piece in a 19th slot, the upper coil piece in a 26th slot, the jumper wire 12, the lower coil piece in a 30th slot, the upper coil piece in a 37th slot, the lower coil piece in a 42nd slot, the upper coil piece in a 49th slot, the lower coil piece in a 54th slot, and the upper coil piece in a 61st slot to the winding lead portion 16.

The windings of the first, third and fourth circuits also take the same form as the windings of the second circuit, but are arranged at different positions in the circumferential direction in each circuit.

In the rotating electrical machine, in general, the rotor rotates around a center point (center point of the stator) 21 of the rotating electrical machine shown in FIG. 11, and a gap 4 between the stator and the rotor is uniform on the circumference. However, a center axis 22 of the rotor may be displaced from the center point 21 of the stator, and a gap eccentricity may occur which makes the gap 4 between the stator and the rotor non-uniform on the circumference. When the gap eccentricity occurs, the magnetic energy coupling the armature and the rotor becomes non-uniform over the entire circumference, and a magnetic attraction force acts.

In a case where the capacity of the rotating electrical machine is increased, the magnetic attraction force generated when the gap eccentricity occurs increases, and the force applied to a bearing or a frame increases. In addition, since the parallel circuits of each phase are wound (lap) around the armature in a general armature winding having a wave winding as shown in FIG. 10, when the gap eccentricity occurs, a current forming a magnetic pole near a portion where the gap becomes narrow and a current forming a magnetic pole near a portion where the gap becomes wide offset each other in a portion. In such a portion, an induced current is less likely to flow, and a force for returning the rotor to the original position cannot be sufficiently exerted on the gap eccentricity. In particular, when the capacity is increased without changing the structure of the existing rotating electrical machine, the rotor cannot be returned to the original position against the gap eccentricity. In this case, there is a possibility that the bearing or the frame cannot withstand deformation, breakage, or contact between the rotor and the stator. On the other hand, when the entire rotating electrical machine is redesigned in order to prevent such a situation, a large amount of time and cost are required. Such a problem also occurs when the rotor constitutes the armature portion 1 and the stator constitutes the field portion 2.

For example, in one conventional armature winding, for a 3-phase 6-pole 108-slot rotating electrical machine having two parallel circuits, each circuit of the two parallel circuits is divided into an upper half and a lower half when viewed from an axial cross section of the rotating machine to form a winding, thereby reducing the magnetic attraction force acting between an armature and a rotor at the time of a gap eccentricity. In the configuration of the conventional armature winding, when a gap eccentricity occurs in the vertical direction as viewed from the axial cross section of the rotating electrical machine, the effect of reducing the magnetic attraction force is obtained. However, it is considered that the effect of reducing the magnetic attraction force is significantly reduced with respect to a gap eccentricity in the horizontal direction.

Under the circumstances, it is desired to provide an armature winding of a rotating electrical machine and to provide a rotating electrical machine capable of pushing a rotor at the time of occurrence of a gap eccentricity back to an original position against the gap eccentricity in an entire circumferential direction viewed from an axial cross section of the rotating electrical machine by changing a winding method of the armature winding while making use of an existing configuration.

DETAILED DESCRIPTION

Embodiments will be described with reference to the drawings.

In general, according to one embodiment, there is provided an armature winding of a rotating electrical machine, the armature winding being a 3-phase 6 or more even-number pole two-layer wound armature winding. The armature winding includes three or more parallel circuits provided in each phase, an individual coil constituting each of the circuits being connected by wave winding, each circuit being arranged so that phase belts respectively overlap phase belts of "number of poles/2" in the circuits on both adjacent sides, and the phase belts being arranged at different positions in a circumferential direction in each circuit.

Figure 1:
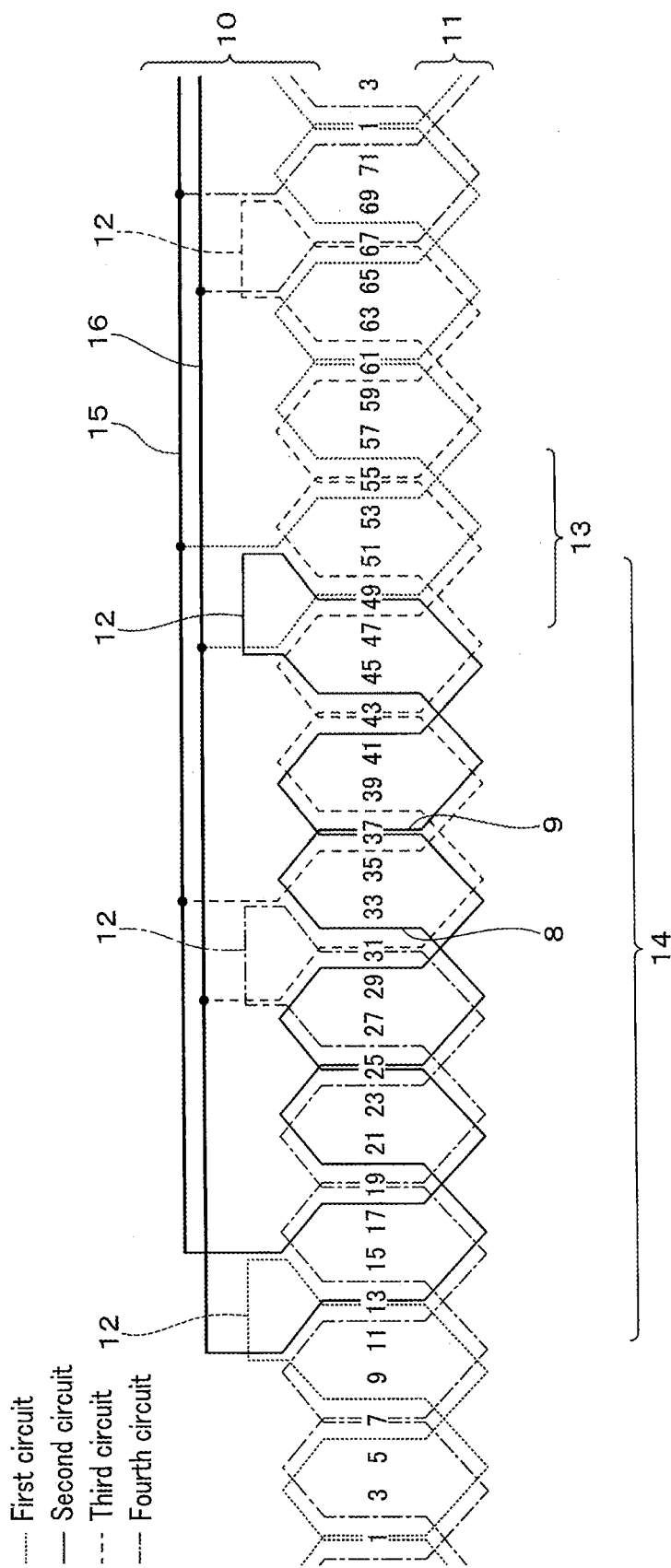
FIG. 1 is a schematic development view of one phase of an armature winding of a rotating electrical machine according to an embodiment.

FIG. 1 is a schematic development view of one phase of an armature winding of a rotating electrical machine according to the embodiment. In FIG. 1, the same elements as those described above are denoted by the same reference numerals.

In this embodiment, a 12-pole 72-slot rotating electrical machine having four parallel circuits is taken as an example. Although only one phase of the armature winding is illustrated in FIG. 1, the other two phases not illustrated in FIG. 1 are obtained by shifting the configuration of the armature winding of the illustrated phase by 120 degrees and 240 degrees in electrical angle, respectively. Although slot numbers are shown in FIG. 1, only odd-numbered slots are shown and even-numbered slots are omitted to avoid complexity.

In the armature of the rotating electrical machine shown in FIG. 1, 72 slots are provided in an armature core 5 formed of a laminated core, and a 12-pole 3-phase armature winding having four parallel circuits is housed in two layers in these slots.

The armature winding of each phase includes upper coil pieces 8 disposed on an opening side in the slot and lower coil pieces 9 disposed on a bottom side of the slot, and the upper coil pieces 8 and the lower coil pieces are sequentially connected in series in the circumferential direction of the rotating electrical machine in a range of six phase belts 13 at a connection side coil end 10 in which the ends of the upper coil pieces 8 and the lower coil pieces 9 are connected to wiring lead portions 15 and 16 and a counter-connection side coil end 11 not connected to wiring lead portions on the opposite side in the axial direction, and thereafter folded via a jumper wire 12 and further sequentially connected in the circumstantial direction in the range of the six phase belts 13. Furthermore, each of the phase belts 14 of each parallel circuit is wound so as to overlap three phase belts 14. That is, the respective parallel circuits are arranged so that the phase belts 14 overlap the phase belts 13 corresponding to the number of pole pairs (number of poles/2) in the circuits on both adjacent sides, and the phase belts 14 are arranged at different positions in the circumferential direction in each circuit.

Figure 2:
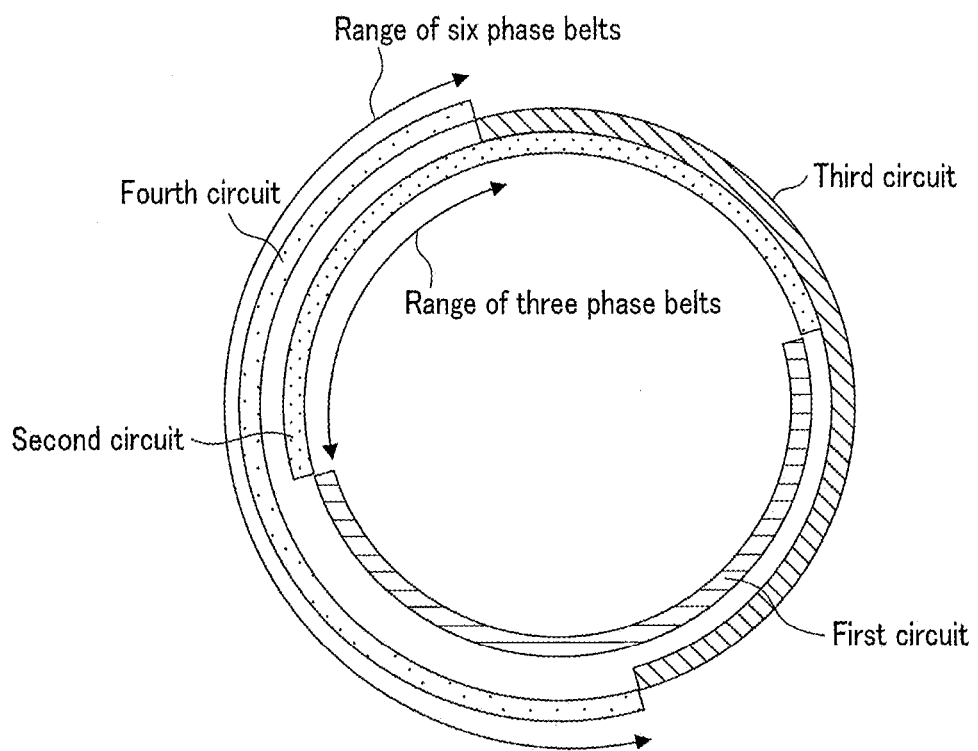
FIG. 2 is a coil arrangement image view of parallel circuits corresponding to one phase of the armature winding in the embodiment.
Figure 3:
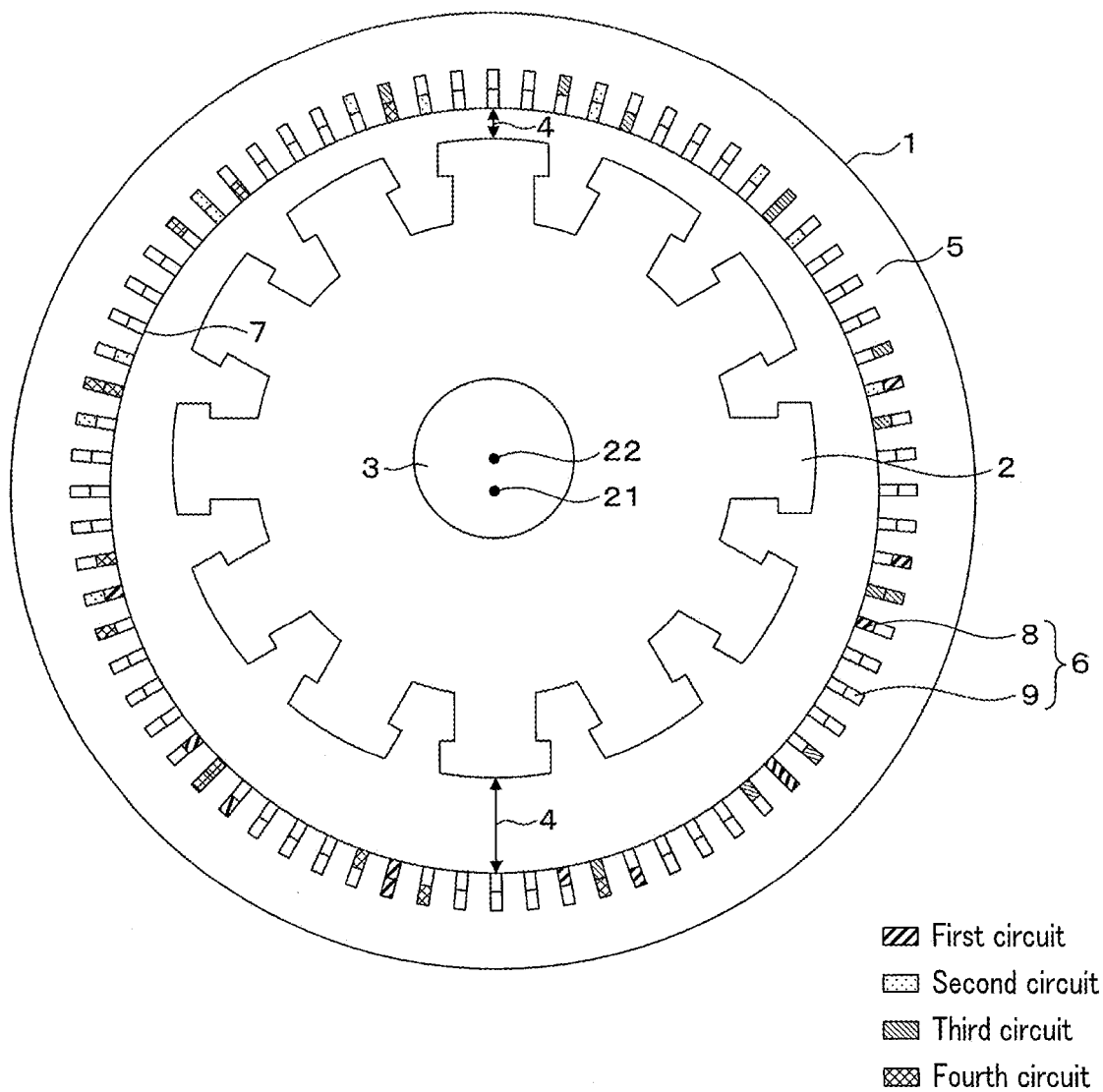
FIG. 3 is an axial cross-sectional view of the rotating electrical machine having parallel circuits in the embodiment.

FIG. 2 shows a coil arrangement image of the parallel circuits corresponding to one phase of the armature winding shown in FIG. 1, and FIG. 3 shows an axial cross section of the rotating electrical machine having the parallel circuits.

Each parallel circuit is wound with six phase belts 14 (corresponding to a mechanical angle of 180 degrees) shown in FIG. 1, and coils are arranged so that each of the phase belts 14 of each parallel circuit overlaps three phase belts 14 (corresponding to a mechanical angle of 90 degrees).

Here, the armature winding method according to the present embodiment will be described by taking a second circuit of the four parallel circuits (first to fourth circuits) shown in FIGS. 1 to 3 as an example.

As shown in FIG. 1, the winding of the second circuit is led from the winding lead portion 15 through the lower coil piece in an 18th slot, the upper coil piece in a 25th slot, the lower coil piece in a 30th slot, the upper coil piece in a 37th slot, the lower coil piece in a 42nd slot, the upper coil piece in a 49th slot, the jumper wire 12, the upper coil piece in a 44th slot, the lower coil piece in a 37th slot, the upper coil piece in a 32nd slot, the lower coil piece in a 25th slot, the upper coil piece in a 20th slot, and the lower coil piece in a 13th slot to the winding lead portion 16.

The windings of the first, third and fourth circuits also take the same form as the windings of the second circuit, but are arranged at different positions in the circumferential direction in each circuit.

In the present embodiment, a case of 3-phase 6-pole two-layer wound armature winding is illustrated, but the present invention is not limited thereto. For example, the number of poles may be an even number of six or more poles, and is not limited to six poles. Although the number of parallel circuits is four in the present embodiment, the present invention is not limited to this. For example, it suffices that three or more parallel circuits are provided in each phase, and the number of parallel circuits is not limited to four. In this case, the number of poles/the number of parallel circuits is set to be an integer. It is desirable to arrange the phase belts 14 of each circuit by shifting the position by "the number of phase belts/the number of parallel circuits" in the circumferential direction.

When the number of poles is 2P and the number of parallel circuits is n (P and n are arbitrary natural numbers), it is desirable that each circuit have "4P/n" phase belts 13 forming "phase belts 14" and that the phase belts 14 be shifted by "2P/n" phase belts in the circumferential direction in each circuit.

If the above-described configuration is adopted, when a gap eccentricity occurs, a difference in inductance occurs in parallel circuits, and a difference in voltage between circuits occurs. Accordingly, a circulating current causing a force in the opposite direction to the magnetic attraction force flows in a circuit where the voltage becomes high (a circuit corresponding to a position where the gap 4 becomes narrow), and a circulating current causing a force in the same direction as the magnetic attraction force flows in a circuit where the voltage becomes low (a circuit corresponding to a position where the gap 4 becomes wide). Thus, a force to push the rotor whose central axis is displaced back to the original position acts.

Hereinafter, the above-described operation will be described in more detail with reference to FIGS. 4 and 5.

Figure 4:
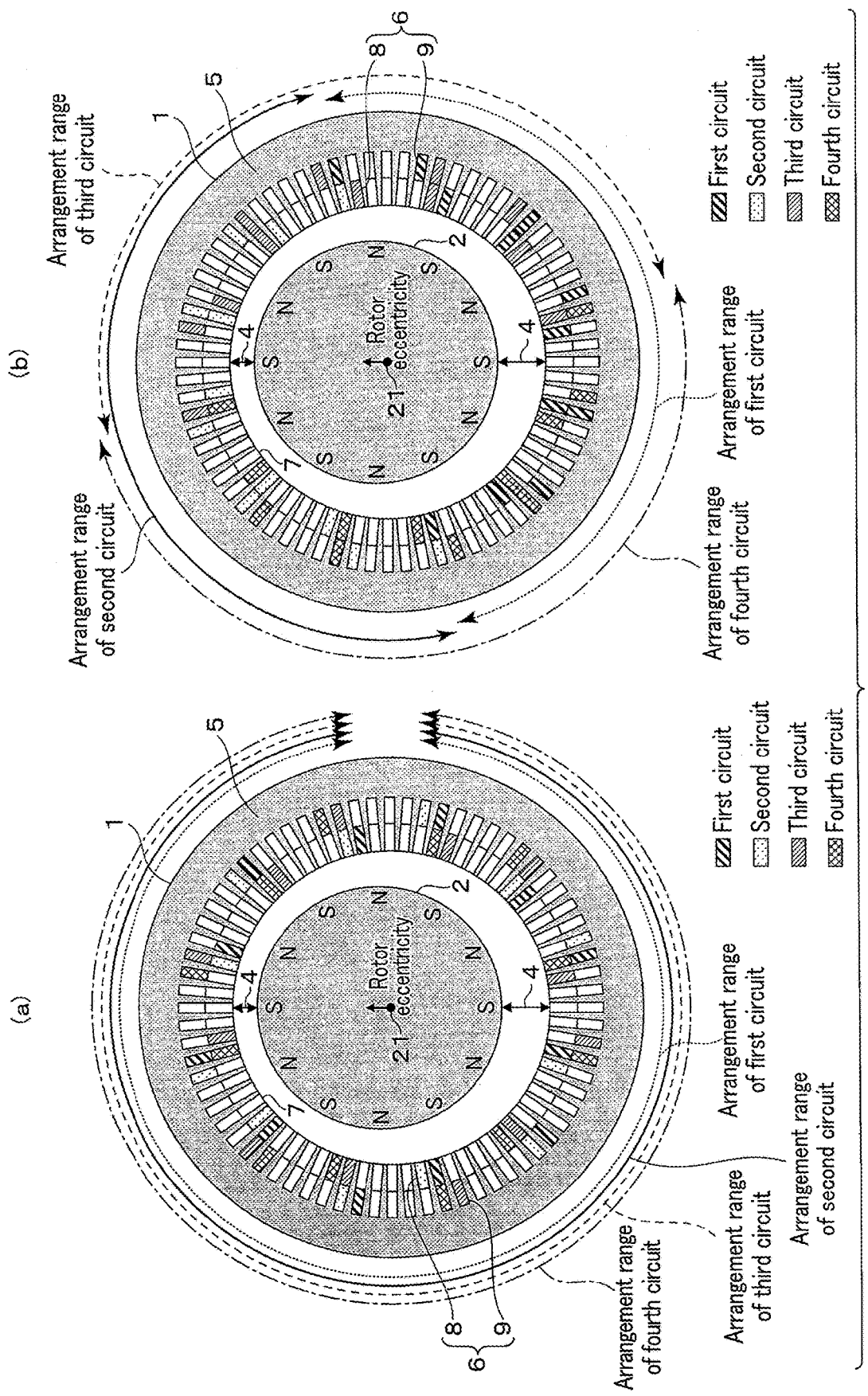
FIG. 4 is a view showing a coil arrangement and an arrangement range of parallel circuits of one phase of the armature winding in each of the conventional winding method and the embodiment.

FIG. 4 (a) is a view showing the coil arrangement and the arrangement range of each parallel circuit of one phase of the armature winding by the conventional winding method. FIG. 4 (b) is a view showing the coil arrangement and the arrangement range of each parallel circuit of one phase of the armature winding by the present embodiment.

In FIG. 4 (a) and (b), the size of the armature winding 6 (the upper coil pieces 8 and the lower coil pieces 9) of each parallel circuit housed in the slot 7 provided in the armature core 5 of the stator (armature portion) 1 is shown to be larger, and the shape of the rotor (field portion) 2 is simplified to be circular, in order to facilitate understanding of the coil arrangement of each parallel circuit.

In the conventional winding method, as shown in FIG. 4 (a), four parallel circuits (a first circuit, a second circuit, a third circuit, and a fourth circuit) are each arranged so as to wind around (lap) the stator 1. On the other hand, in the winding method of the present embodiment, as shown in FIG. 4 (b), four parallel circuits (a first circuit, a second circuit, a third circuit, and a fourth circuit) are each arranged within a range of a mechanical angle of 180 degrees in the circumferential direction and are arranged so as to be shifted from each other by a mechanical angle of 90 degrees in the circumferential direction.

As described above, since the arrangement of the windings is different between the conventional winding method and the winding method of the present embodiment, the operation and effect are different as described below.

In each of the conventional winding method and the winding method of the present embodiment, as shown in FIG. 4 (a) and (b), a case is considered in which a gap eccentricity occurs such that the central axis of the rotor 2 is displaced from the central point 21 of the stator 1 and the gap 4 between the stator 1 and the rotor 2 becomes non-uniform on the circumference.

Figure 5:
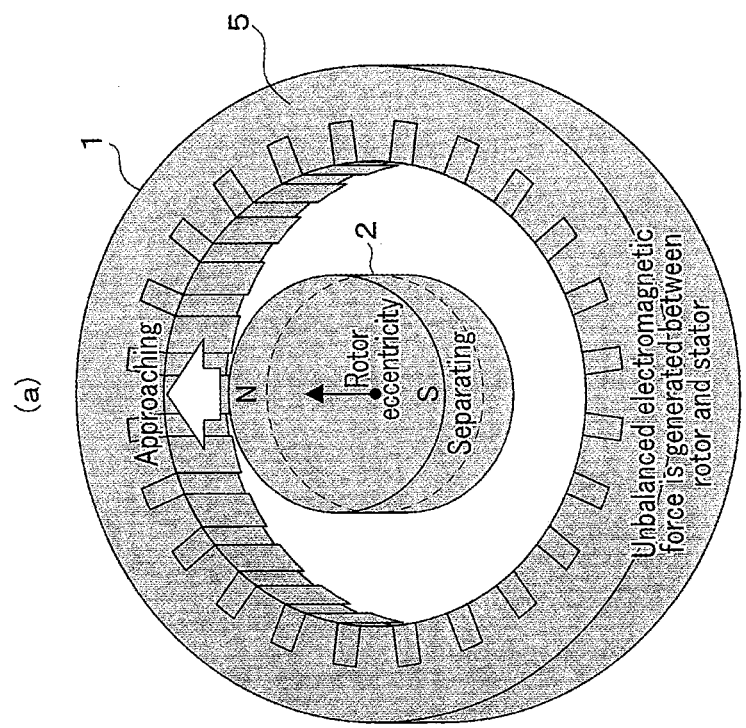
FIG. 5 is a view for explaining the principle of a force acting to return the rotor to the original position when the eccentricity of the rotor occurs.
Figure 5:
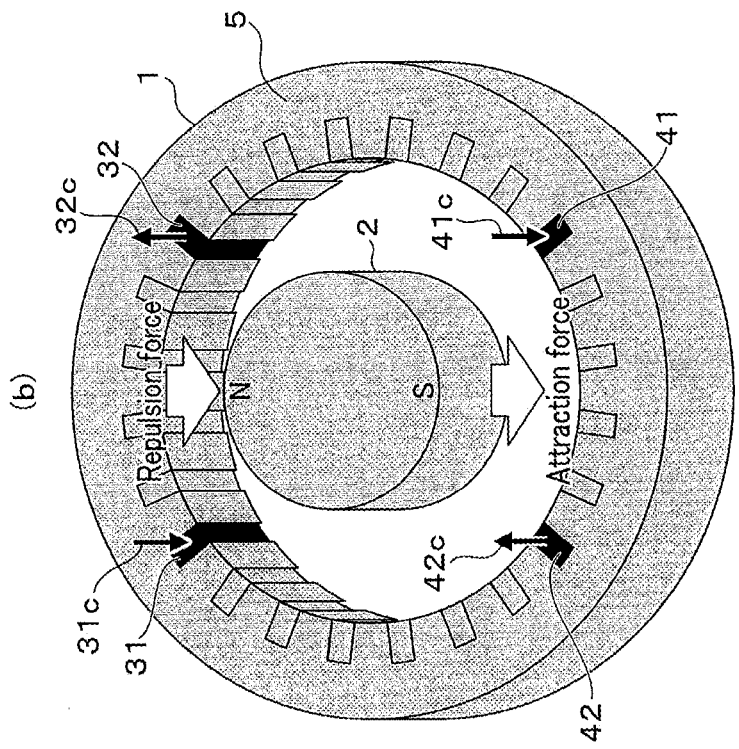

FIG. 5 shows an outline of the principle in which a force acts to return the rotor 2 to the original position when the gap eccentricity occurs due to the rotor 2. FIG. 5 illustrates an example in which the armature portion 1 and the field portion 2 have simple configurations in order to avoid complication of the description. In addition, the distinction between the upper coil pieces and the lower coil pieces and the illustration thereof are also omitted.

As shown in FIG. 5 (a), when a part of the rotor 2 is separated from the stator 1 and the other part approaches the stator 1 due to the eccentricity of the rotor 2, an unbalanced electromagnetic force is generated between the rotor 2 and the stator 1.

When such an unbalanced electromagnetic force is generated, a force (repulsion force, attraction force) acts to return the rotor 2 to the original position in order to return the electromagnetic force between the rotor 2 and the stator 1 to an equilibrium state.

For example, as shown in FIG. 5 (b), in order to generate a repulsion force that pushes the rotor 2 back to the original position by generating an N-pole at the position opposing the side of the stator 1 when an N-pole portion of the rotor 2 approaches the stator 1 (or generating an S-pole at the position opposing the side of the stator 1 when an S-pole portion of the rotor 2 approaches the stator 1), induced currents 31c and 32c flow in the armature winding on the side of the stator 1 (for example, the armature winding arranged so as to be directed in the direction indicated by the arrow (the direction toward the stator axis) from the position of the slot 31 and then reversed to return to the position of the slot 32). Furthermore, in order to generate an attraction force that attracts the rotor 2 back to the original position by generating an N-pole at the position opposing the side of the stator 1 when an S-pole portion of the rotor 2 separates from the stator 1 (or generating an S-pole at the position opposing the side of the stator 1 when an N-pole portion of the rotor 2 separates from the stator 1), induced currents 41c and 42c flow in the armature winding on the side of the stator 1 (for example, the armature winding arranged so as to be directed in the direction indicated by the arrow (the direction toward the stator axis) from the position of the slot 41 and then reversed to return to the position of the slot 42).

The aforementioned repulsion force and attraction force can be generated in both the conventional winding method and the winding method of the present embodiment. However, in the case of the conventional winding method, as shown in FIG. 4 (a), four parallel circuits (the first circuit, the second circuit, the third circuit, and the fourth circuit) are arranged in series so as to wind around (lap) the armature portion 1. Due to the arrangement, the following problems occur.

In the case of the conventional winding method, as shown in FIG. 4 (a), for example, the armature winding 6 of the second circuit exists in the vicinity of where the rotor 2 approaches the stator 1, and the armature winding 6 of the second circuit also exists in the vicinity of where the rotor 2 separates from the stator 1. In the armature winding 6 of the second circuit existing in the vicinity of where the rotor 2 approaches the stator 1, the induced current tends to flow in the direction in which the repulsion force is generated, while in the armature winding 6 of the second circuit existing in the vicinity of where the rotor 2 separates from the stator 1, the induced current tends to flow in the direction in which the attraction force is generated.

However, since the two armature windings 6 are connected in series, the induced current that tends to flow in the direction in which the repulsion force is generated in the armature winding 6 of the second circuit that exists in the vicinity of where the rotor 2 approaches the stator 1 also tends to flow in the armature winding 6 of the second circuit that exists in the vicinity of where the rotor 2 separates from the stator 1 (that is, the armature winding 6 where the induced current tends to flow in the direction of generating the attraction force), and the induced currents of the two offset each other. Similarly, the induced current that tends to flow in the direction in which the attraction force is generated in the armature winding 6 of the second circuit that exists in the vicinity of where the rotor 2 separates from the stator 1 also tends to flow in the armature winding 6 of the second circuit that exists in the vicinity of where the rotor 2 approaches the stator 1 (that is, the armature winding 6 where the induced current tends to flow in the direction of generating the repulsion force), and the induced currents of the two offset each other.

Such offset of the induced currents occurs not only when the rotor 2 approaches an area in the vicinity of where the armature winding 6 of the second circuit exists but also when the rotor 2 approaches an area in the vicinity of the armature winding 6 of any one of the first, third, and fourth circuits. As a result, when an unbalanced electromagnetic force is generated due to the eccentricity of the rotor 2, a force for returning the rotor 2 to the original position does not effectively act.

On the other hand, in the case of the winding method of the present embodiment, as shown in FIG. 4 (b), for example, the armature winding 6 of the second circuit exists in the vicinity of where the rotor 2 approaches the stator 1, but the armature winding 6 of the second circuit does not exist in the vicinity of where the rotor 2 separates from the stator 1, and the armature winding 6 of the first circuit or the fourth circuit exists. In the armature winding 6 of the second circuit existing in the vicinity of where the rotor 2 approaches the stator 1, the induced current tends to flow in the direction in which the repulsion force is generated, but in the vicinity of where the rotor 2 separates from the stator 1, the armature winding 6 of the second circuit does not exist, so that the aforementioned offset of induced currents does not occur and the induced current in the direction in which the repulsion force is generated flows in the armature winding 6 of the second circuit. Furthermore, in the armature winding 6 of the first circuit or the fourth circuit existing in the vicinity of where the rotor 2 separates from the stator 1, the induced current tends to flow in the direction in which the attraction force is generated, but in the vicinity of where the rotor 2 separates from the stator 1, the armature winding 6 of the first circuit or the fourth circuit does not exist, so that the aforementioned offset of induced currents does not occur and the induced current in the direction in which the attraction force is generated flows in the armature winding 6 of the first circuit or the fourth circuit.

Such an effect occurs not only when the rotor 2 approaches the area in the vicinity of where the armature winding 6 of the second circuit exists but also when the rotor 2 approaches the area in the vicinity of the armature winding 6 of any one of the first, third, and fourth circuits. Further, since the winding arrangement is such that the arrangement range of each circuit partially overlaps the arrangement range of the adjacent circuit, the effect of reducing the unbalanced electromagnetic force can be obtained regardless of the direction of the eccentricity of the rotor 2. As a result, when an unbalanced electromagnetic force is generated due to the eccentricity of the rotor 2, a force (repulsion force or attraction force) for returning the rotor 2 to the original position acts effectively.

According to the present embodiment, when a gap eccentricity occurs in the vertical direction as viewed from the axial cross section of the rotating electrical machine, circulating currents mainly flow through the first circuit and the second circuit, a circulating current causing a force in the same direction as the magnetic attraction force flows through the first circuit, and a circulating current causing a force in the opposite direction to the magnetic attraction force flows through the second circuit, so that the rotor at a time of an occurrence of the gap eccentricity can be pushed back to the original position. Further, when a gap eccentricity occurs in the horizontal direction when viewed from the axial cross section of the rotating electrical machine, the circulating currents mainly flow through the third circuit and the fourth circuit, so that a force that pushes the rotor whose central axis is displaced back to the original position acts. As a result, in the present embodiment, it is possible to obtain an effect whereby the rotor can be pushed back to the original position when the gap eccentricity occurs, for gap eccentricity in all circumferential directions viewed from the axial cross section of the rotating electrical machine.

Figure 6:
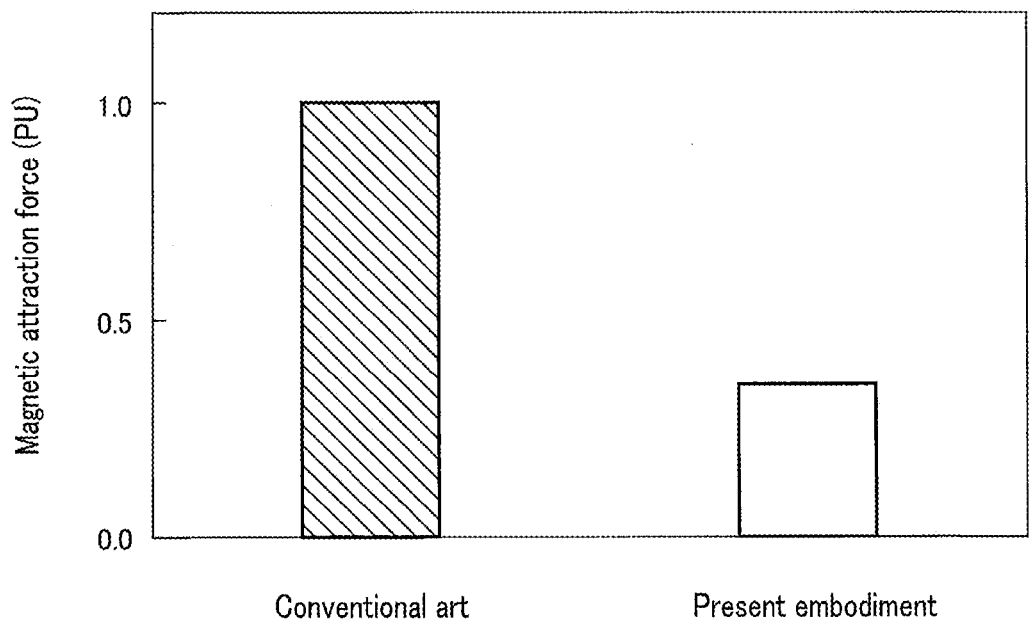
FIG. 6 is a diagram showing an example of comparison results obtained by numerically analyzing the magnetic attraction force acting on the rotor when a gap eccentricity occurs in the conventional winding method and the winding method of the embodiment.
Figure 7:
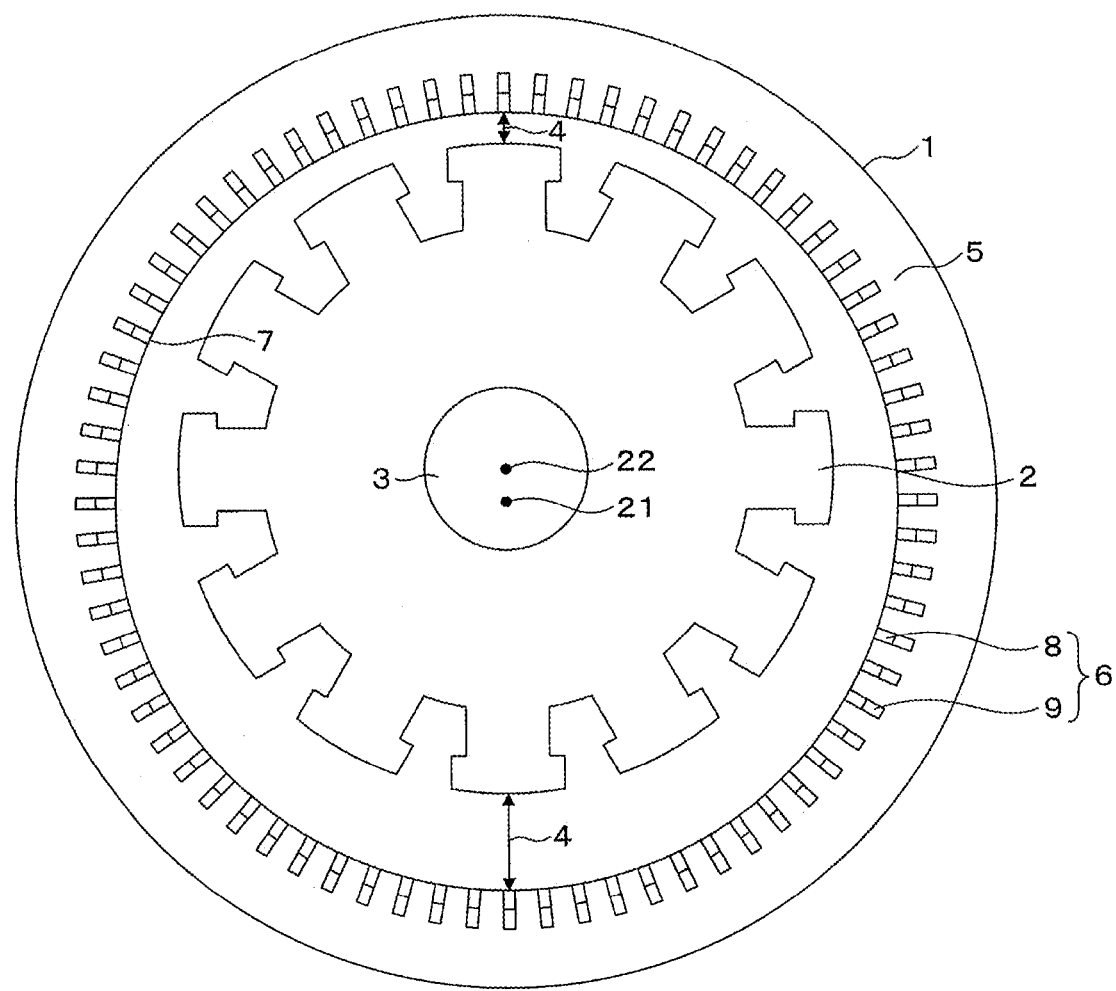
FIG. 7 is an axial cross-sectional view of a general rotating electrical machine.
Figure 8:
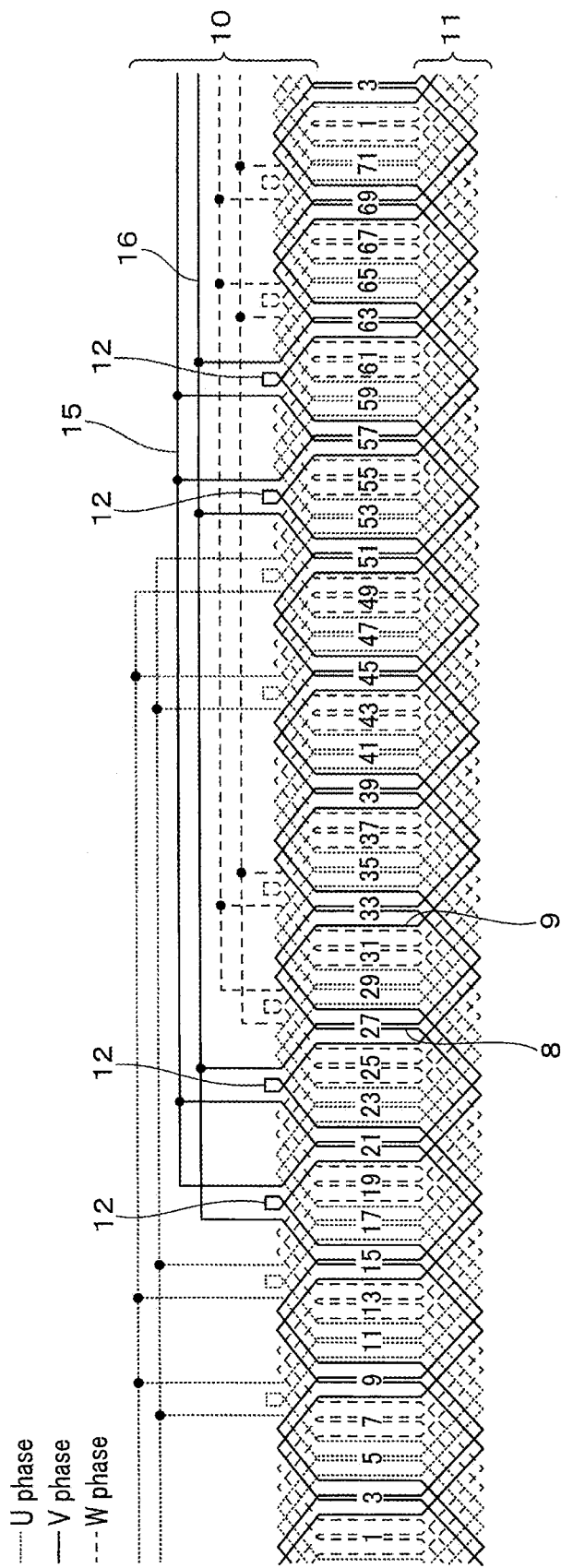
FIG. 8 is a schematic development view of an armature winding of a general wave winding in a 3-phase 12-pole 72-slot rotating electrical machine having four parallel circuits.
Figure 9:
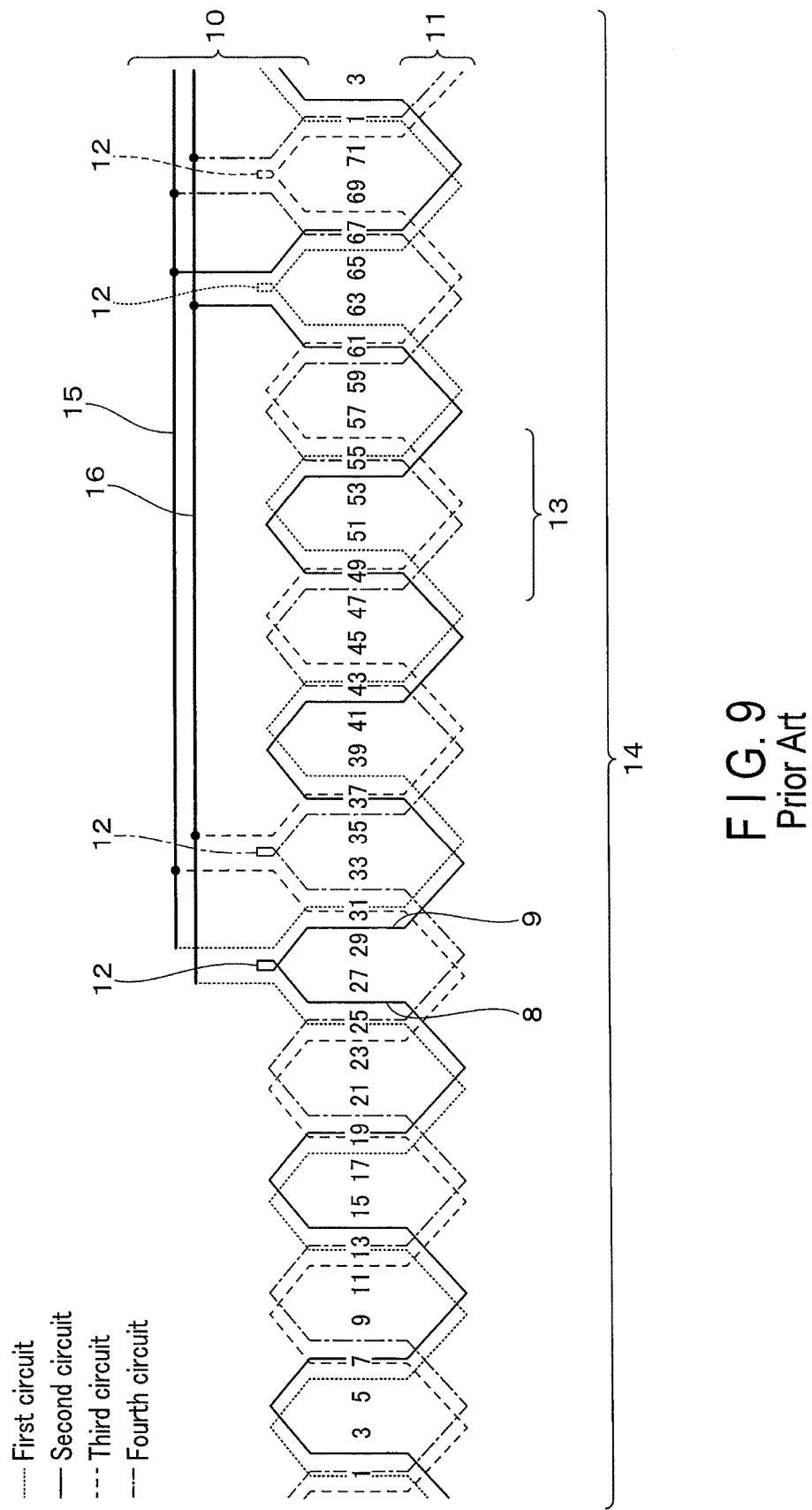
FIG. 9 is a diagram showing only one phase of the schematic development view of the armature winding shown in FIG. 8, and separately showing the four parallel circuits in the one phase.
Figure 10:
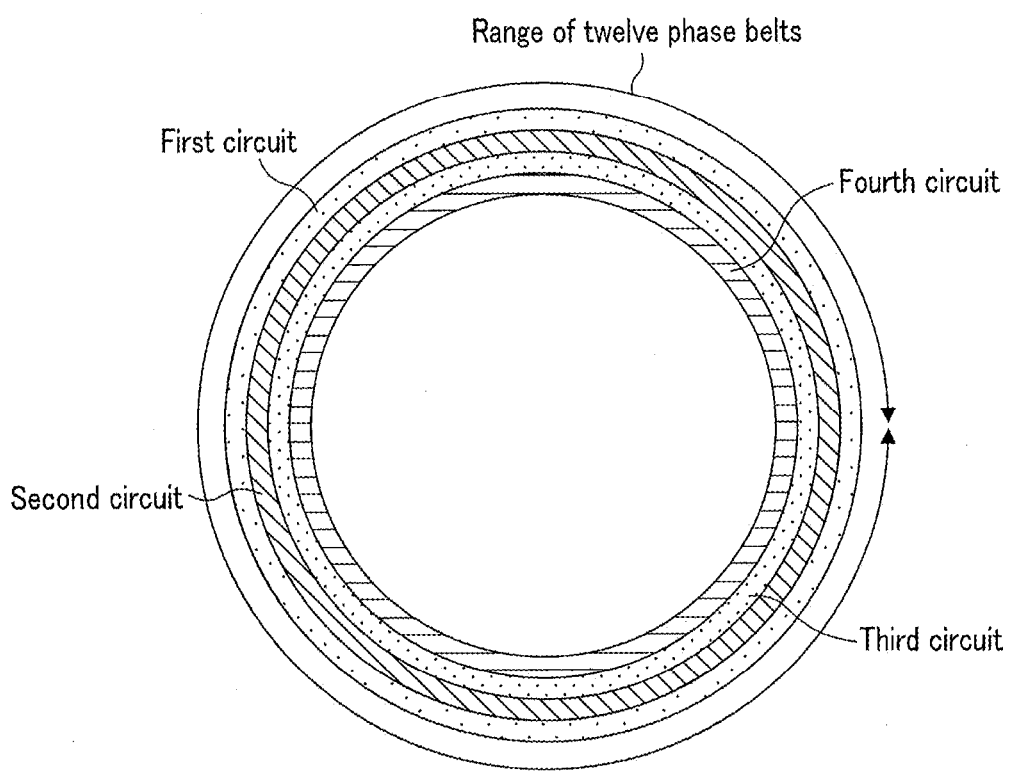
FIG. 10 is a coil arrangement image view of parallel circuits corresponding to one phase of a conventional armature winding.
Figure 11:
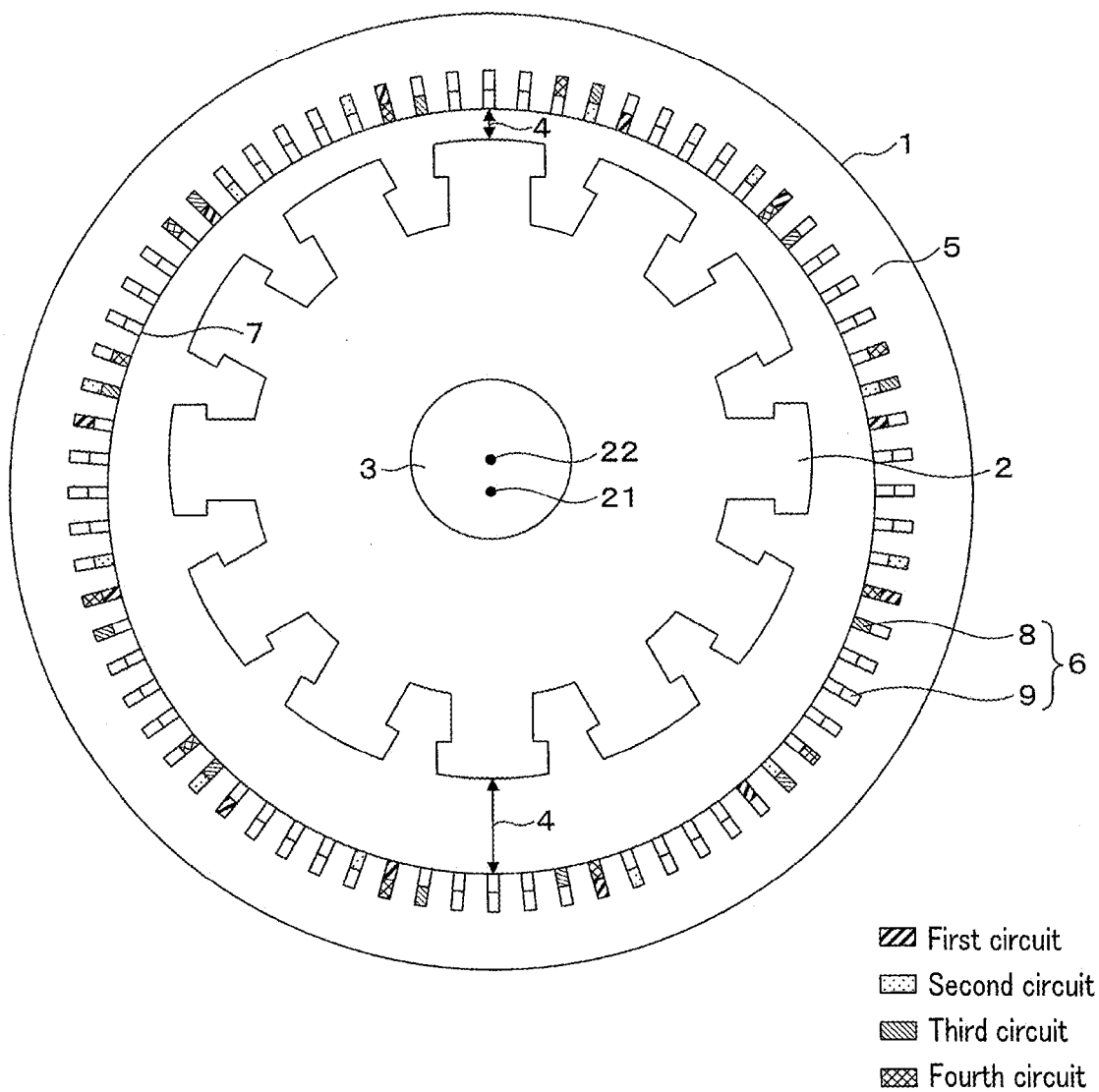
FIG. 11 an axial cross-sectional view of a rotating electrical machine having parallel circuits arranged by the conventional method.

FIG. 6 shows an example of a comparison result obtained by numerically analyzing the magnetic attraction force acting on the rotor when the gap eccentricity occurs in the conventional winding method of FIG. 11 and the winding method of the present embodiment. In FIG. 6, the horizontal axis represents the magnetic attraction force acting on the rotor in the conventional winding method as 1 PU.

From the results of the numerical analysis in FIG. 6, it was confirmed that by applying the winding method of the present embodiment, an effect of pushing the rotor whose central axis is displaced back to the original position can be obtained as compared with the conventional winding method.

As described above in detail, according to the embodiments, by changing the winding method of the armature winding while utilizing the existing configuration, it is possible to push the rotor back to the original position when the gap eccentricity occurs, for gap eccentricity in all circumferential directions viewed from the axial cross section of the rotating electrical machine.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An armature winding of a rotating electrical machine, the armature winding being a 3-phase 6 or more even-number pole two-layer wound armature winding and comprising:
   three or more parallel circuits provided in each phase, an individual coil constituting each of the circuits being connected by wave winding, each circuit being arranged so that phase belts respectively overlap phase belts of "number of poles/2" in the circuits on both adjacent sides, and the phase belts being arranged at different positions in a circumferential direction in each circuit.

2. The armature winding of the rotating electrical machine according to claim 1, wherein the phase belts are arranged so as to be shifted by "number of phase belts/number of parallel circuits" in the circumferential direction in each circuit.

3. The armature winding of the rotating electrical machine according to claim 1, wherein the number of poles is 2P, and the number of parallel circuits is n (P and n are arbitrary natural numbers), and
   each circuit has "4P/n" phase belts, which are arranged so as to be shifted by "2P/n" phase belts in the circumferential direction in each circuit.

4. The armature winding of the rotating electrical machine according to claim 1, wherein the number of poles/the number of parallel circuits is an integer.

5. A rotating electrical machine comprising the armature winding according to claim 1.

* * * * *